(12) United States Patent
Taniguchi et al.

(10) Patent No.: US 7,457,975 B2
(45) Date of Patent: Nov. 25, 2008

(54) INFORMATION PROCESSING APPARATUS WITH A FUNCTION FOR LOW-POWER OPERATION BY CONTROLLING A POWER SUPPLY TO A RECORDING SECTION OF A RECORDING MEDIUM AND A COMPUTER INDIVIDUALLY

(75) Inventors: Hisashi Taniguchi, Ibaraki (JP); Tetsuya Esaki, Osaka (JP); Tomoyuki Aoki, Yawata (JP)

(73) Assignee: Panasonic Corporation, Osaka (JP)

( * ) Notice: Subject to any disclaimer, the term of this patent is extended or adjusted under 35 U.S.C. 154(b) by 363 days.

(21) Appl. No.: 11/028,072

(22) Filed: Jan. 4, 2005

(65) Prior Publication Data

US 2005/0166078 A1 Jul. 28, 2005

(30) Foreign Application Priority Data

Jan. 23, 2004 (JP) ............................. 2004-015279

(51) Int. Cl.
G06F 1/00 (2006.01)
G06F 1/26 (2006.01)
G06F 1/32 (2006.01)
(52) U.S. Cl. ..................... 713/324; 713/300; 713/320
(58) Field of Classification Search ................ 713/300, 713/330, 340, 320, 324
See application file for complete search history.

(56) References Cited

U.S. PATENT DOCUMENTS

| | | | | |
|---|---|---|---|---|
| 4,658,307 A | * | 4/1987 | Tsuyuguchi et al. | 360/69 |
| 4,918,743 A | * | 4/1990 | Tsuyuguchi | 388/812 |
| 5,077,722 A | * | 12/1991 | Geist et al. | 720/657 |
| 5,666,538 A | * | 9/1997 | DeNicola | 713/320 |
| 5,675,567 A | * | 10/1997 | Skarda | 720/645 |
| 5,765,004 A | * | 6/1998 | Foster et al. | 713/323 |
| 5,881,300 A | * | 3/1999 | Chen | 713/340 |
| 5,898,828 A | * | 4/1999 | Pignolet et al. | 714/6 |
| 6,628,469 B1 | * | 9/2003 | Hoyt | 360/69 |
| 2001/0009401 A1 | * | 7/2001 | Hayashi | 341/22 |
| 2003/0221135 A1 | * | 11/2003 | Motoe et al. | 713/300 |

FOREIGN PATENT DOCUMENTS

JP 03-116315 5/1991

* cited by examiner

*Primary Examiner*—Mark Connolly
(74) *Attorney, Agent, or Firm*—Wenderoth, Lind & Ponack, L.L.P.

(57) ABSTRACT

An information processing apparatus which comprising a recording section for recording information in a removable recording medium, a switch, a computer, a power supply section for supplying power to the recording section and the computer, and an operating system which is software for controlling the computer. The power supply section controls power supply to the recording section and the computer individually and, only the power supply to the recording section is controlled ON/OFF corresponding to a state of the switch. The operating system conducts a processing based on a presumption that the recording section is not connected. Under the above-described configuration, when there is no access made to the recording section, the power supply is disconnected not only to the recording section but also to a constituent part used for making access to the recording section. Thus the advantage of low-power operation is further enhanced.

14 Claims, 9 Drawing Sheets

INFORMATION PROCESSING APPARATUS WITH A FUNCTION FOR LOW-POWER OPERATION BY CONTROLLING A POWER SUPPLY TO A RECORDING SECTION OF A RECORDING MEDIUM AND A COMPUTER INDIVIDUALLY

FIELD OF THE INVENTION

The present invention relates to an information processing apparatus comprising a recording section for recording information in a recording medium, a power supply section for supplying electricity to the recording section and computer, and an operating system, or software, for controlling the computer; in which apparatus the power supply section is provided with a function for controlling supply of electric power to the recording section and the computer.

BACKGROUND OF THE INVENTION

A personal computer as disclosed in Japanese Patent Unexamined Publication No. H3-116315 is an example of conventional information processing apparatus provided with a power supply section which controls supply of electric power to the recording section and the computer.

The conventional technology features that, in a battery/AC compatible computer system in which a resume mode and an automatic HDD (Hard-Disk Drive) power-OFF mode are set in the boot up system, it is provided with means to judge whether or not an AC adaptor is connected for supplying power to the system. Additionally, conventional technology includes means to stop the motor of the HDD if no AC adaptor is connected at the boot up. The HDD motor is brought to a halt only when no AC adaptor is connected, for the purpose of extending a battery operating time.

FIG. 9 is a flow chart showing a conventional initializing routine that follows a power-ON operation.

When power supply to an information processing apparatus is turned ON (S901), a microcomputer makes access to a BIOS-ROM, and the initializing routine shown in FIG. 9 is started.

Firstly, a set-up data stored in a battery-backup memory disposed in a clock module is referred to, in order to check if resume mode is enable, or not (S902).

If resume mode is not enable, viz. resume mode is disable, it executes normal boot up process (S907).

If resume mode is enable, then it checks whether or not an AC adaptor is connected (S903). At this moment, the microcomputer gets, from a power control microcomputer of intelligent power supply via an I/O controller, an information regarding the power supply status. Thus it can recognize whether the processing apparatus is being driven on a built-in main battery, or on an AC source.

If it is found that no AC adaptor is in use, viz. it is operated on the main battery, then setup data stored in a memory disposed within the clock module is referred to, in order to check whether or not the HDD auto power-OFF mode is enable (S904).

If the HDD auto power-OFF mode is enable, a HDD motor-OFF command is delivered to a HDD interface (S905) to set the HDD motor-OFF command in an interface register within the HDD interface. Upon receiving the HDD motor-OFF command set in the interface register of HDD interface, the HDD disconnects power supply to HDD motor to stop revolution of the HDD motor.

The microcomputer restores the processing apparatus to a state just before the disconnection of power supply, in accordance with the data of just before the power disconnection which is stored in the backup RAM (B-RAM). Thus the processing apparatus is set to a state where it can start from the state just before the power disconnection (S906).

After the processing apparatus is set to a state just before the power disconnection in accordance with the resume function described above, when an operator makes access to HDD through a keyboard, etc., the microcomputer releases the HDD motor-OFF command which has been set in the interface register within the HDD interface. When the HDD motor-OFF command is released, the power supply for driving HDD motor is released from the disconnected state; then, revolution of HDD motor is started and the HDD gets activated.

If no input operation is made through a keyboard, etc. within a certain predetermined time span while the HDD auto power-OFF mode is enable, the HDD motor-OFF command is set in the interface register within HDD interface, and the HDD motor stays halted in accordance with the command.

In the initializing routine at power ON shown in FIG. 9, if it is driven on an AC adaptor (Yes, at S903) despite an enable resume mode (Yes, at S902), a HDD motor-OFF command is not delivered and the HDD gets activated at the same time when the main switch of processing apparatus is turned ON.

In a case where the resume mode is enable (Yes, at S902) and it is driven on a built-in main battery, a HDD motor-OFF command is not delivered, like in the above case, if HDD auto power-OFF mode is disable (No, at S904). The HDD is activated at the same time when the main switch of processing apparatus is turned ON.

As described above, if a resume function is enable and a HDD auto power-OFF mode is enable in the conventional personal computers, HDD motor is not put into operation until a command making access to HDD is generated by an operator through a keyboard, etc., despite switching ON of the main switch of processing apparatus. So, the advantage of low-power operation due to HDD auto power-OFF function is increased; namely, idle power consumption by HDD can be saved and a battery can work for a longer time.

In the above-described conventional information processing apparatus, the power supply for driving a HDD motor can be cut in a status where a HDD auto power-OFF mode is enable and no AC adapter is connected at the time of switch-ON with a processing apparatus' main switch. Meanwhile, however, the power supply to the HDD interface is kept in ON state despite that it is not in use, incurring losses in the standby power consumption.

SUMMARY OF THE INVENTION

The present invention aims to improve the above drawbacks noted above in the conventional technology. An information processing apparatus of the present invention comprises a recording section for recording information in a removable recording medium, a switch, a computer, a power supply section for supplying electric power to the recording section and the computer, and an operating system, or software, for controlling the computer. The power supply section controls power supply to the recording section and to the computer individually; it turns the power supply ON/OFF to the recording section alone in accordance with a state of the switch, while the operating system conducts information processing based on a presumption that the recording section is not connected.

An information processing apparatus of the present invention, which having the above-described structure, disconnects power supply to not only the recording section itself but also such portions used for making access to the recording section, in a situation where there is no access made to the recording section. Thus, an advantage of saving the power consumption is enhanced a step further.

DETAILED DESCRIPTION OF THE INVENTION

Figure 1:
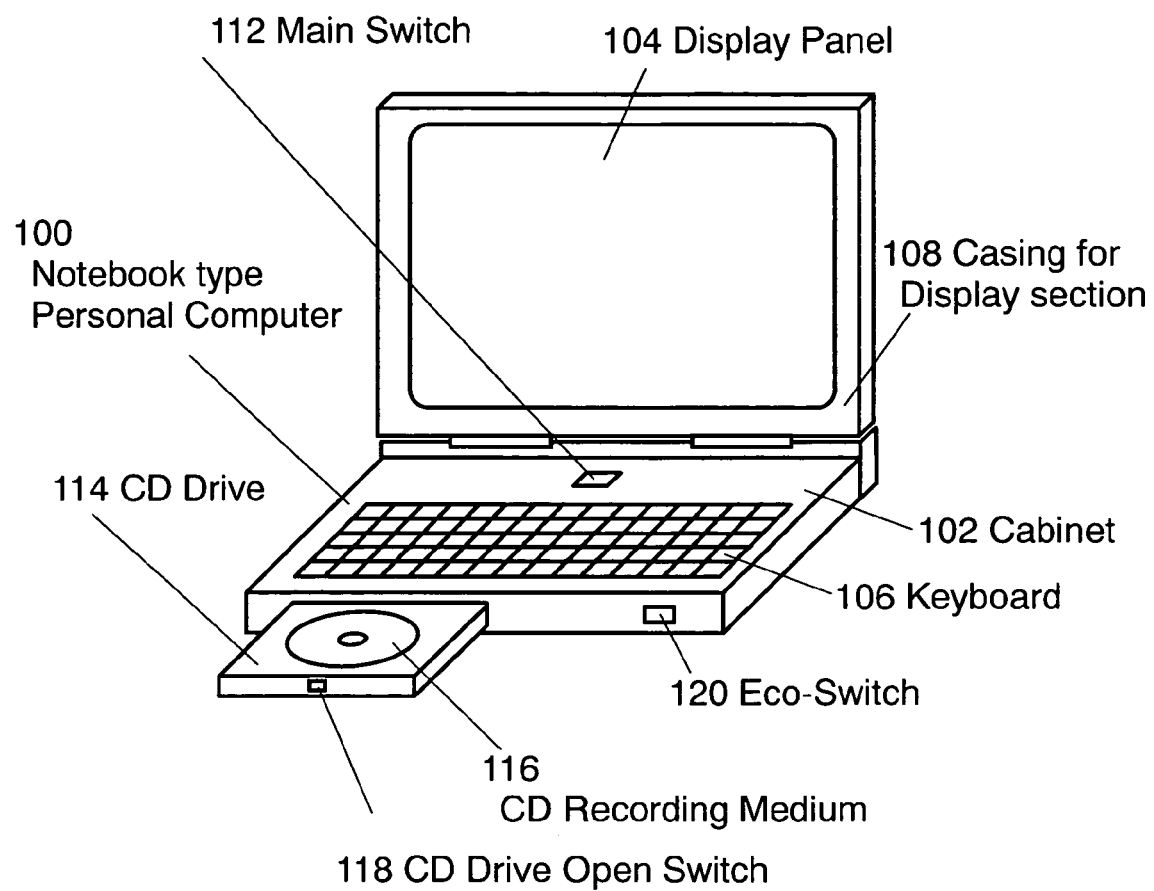
FIG. 1 is a perspective view showing important items of notebook type personal computer in accordance with a first exemplary embodiment of the present invention.

Exemplary embodiments of the present invention are described referring to the drawings.

First Embodiment

FIG. 1 is a perspective view showing important items of an information processing apparatus, or notebook type personal computer 100, in accordance with a first embodiment of the present invention. Although notebook type personal computer 100 is used for describing an information processing apparatus in the present embodiment, it is not the intention of the present invention to limit the processing apparatus to notebook type personal computer 100; the information processing apparatus can be, for example, a personal digital assistant so-called PDA; a portable telephone unit including PHS; a portable positioning system based on a mechanism of e.g. GPS; a portable music player for recording/playing a digitized and compressed, or a non-digitized or uncompressed, music source; a portable video player for recording/viewing a digitized and compressed, or a non-digitized or uncompressed, video soft; an information processing unit or a plurality of such units performing in a part or in the entirety, of the functions played by the above-described systems, players or units; or various types of other such apparatus for use at home or professional application performing these functions in a part or in the entirety.

Notebook type personal computer 100 includes CD drive 114 for the recording section which records information on CD recording medium 116, or a removable recording medium. Although CD drive 114 is used for describing the recording section in the present embodiment, it is not the intension to limit the recording section to CD drive 114; the recording section can be any type of recorders which records information on a removable recording medium of disk shape, such as a FD (floppy disk), a MO, a DVD, by taking advantage of a magnetic, an optical or a chemical technology, or a complex technology thereof. Or, it can be a HDD, which records information using the same technology on a recording medium that is not necessarily removable.

CD drive 114 is built in cabinet 102 of notebook type personal computer 100. CD recording medium 116 can be removed from, or set in CD drive 114 by operating CD drive open switch 118 to draw it out from cabinet 102 towards the front of an operator (in the bottom-left direction in FIG. 1).

Notebook type personal computer 100 has its own functional portions built therein; for example, display panel 104 housed in casing 108 provided for the display section, keyboard 106 mounted on cabinet 102, a main circuit board (not shown) built in cabinet 102, a microcomputer (not shown) and other components (not shown) mounted on the main circuit board, and a first power supply section (not shown) for supplying electric power to operate these constituent parts and components.

In addition, notebook type personal computer 100 is provided with second power supply section 260 (shown in FIG. 2, although not shown in FIG. 1) for supplying electric power for operating CD drive 114.

The above-described two power supply sections may be substituted with a third power supply section (not shown), which is a single substance that performs the above-described two individual functions; or the third power supply section may include three or more number of power supply sections.

For the reason of simplification, following description will be based on a presumption that it has two individual functions, the first power supply section and second power supply section 260. In a case where a third power supply section performing both of the two individual functions is used, it may be interpreted that the third power supply section has a first virtual power supply section and second virtual power supply section 260.

Whatever the structure it may assume, the power supply section is provided with a function to ON/OFF the power supplies for operating CD drive 114 and for operating various other components individually. Or, the power supply section may have a function of supplying operating powers to each of more diversified individual component sectors with independent ON/OFF control.

Notebook type personal computer 100 incorporates, in addition to the above-described components, a non-volatile memory section which includes a HDD memory device (not shown), a flash memory (not shown), a ROM (not shown), etc., and a volatile memory section which includes a DRAM (Dynamic Random Access Memory) (not shown), a SRAM (Static Random Access Memory) (not shown), and other items.

When an operator turns main switch 112 of notebook type personal computer 100 ON, the first power supply section of notebook type personal computer 100 is brought to ON state and starts to deliver operating power to such essential sectors of the notebook type personal computer itself; for example, display panel 104 housed in casing 108, keyboard 106 mounted on cabinet 102, a main circuit board (not shown) housed in cabinet 102, a microcomputer (not shown) and other components (not shown) mounted on the main circuit board, and various kinds of other constituent components.

Software stored in the non-volatile memory section, e.g. ROM, is booted, and an OS (Operating System), for example, which is software stored in e.g. a HDD of non-volatile memory section, is read out. Thus, the computer establishes its basic functions.

Booted OS checks whether notebook type personal computer 100's various kinds of hardware and software, in a part or in the entirety, are operating intact or not. When they are found out to be normal, the basic function of a computer is implemented. If the whole or a part of it is found out to be not-normal, operator is notified accordingly through a display or other means; and the basic function as a computer might not be established.

Notebook type personal computer 100 is further provided with eco-switch 120. Eco-switch 120 is for turning second power supply section 260 ON/OFF, with power supply section 260 delivering electric power to CD drive 114 independent of the first power supply section. Eco-switch 120 may be ON/OFF operated by the hand of an operator; or in other example it may be operated by the control of software, viz. an application program or various other types of software 230, through electronic means via signal line 250.

Suppose that eco-switch 120 is turned ON in accordance with a processing sequence at the time when notebook type personal computer 100's main switch 112 is turned ON, or in accordance with a subsequent processing sequence, or that eco-switch 120 had already been turned ON.

Figure 3:
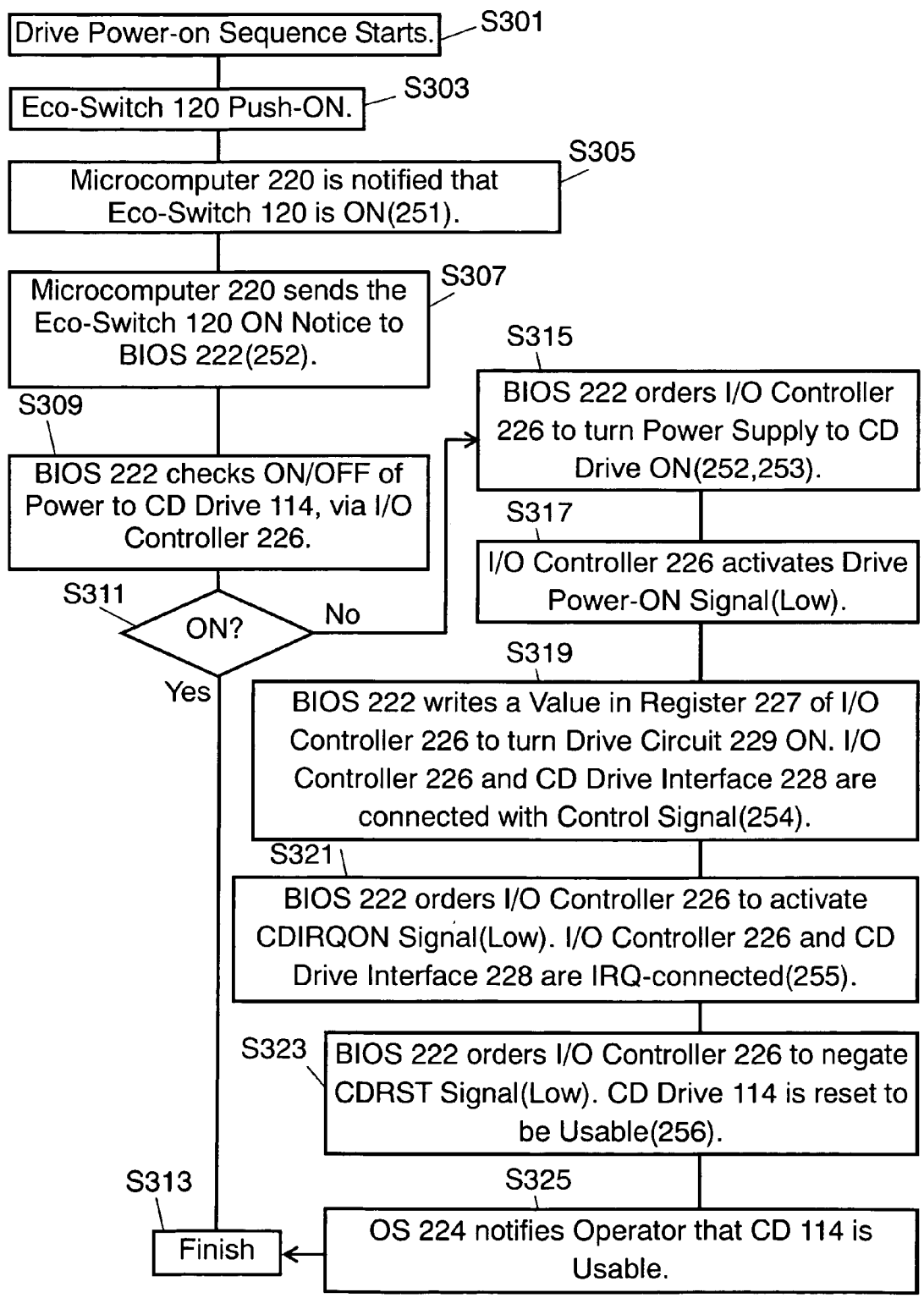
FIG. 3 is a flow chart showing a power-ON sequence of CD drive in notebook type personal computer in the first embodiment.

Then, the CD drive 114 power-ON sequence shown in FIG. 3 is started (S301).

Figure 2:
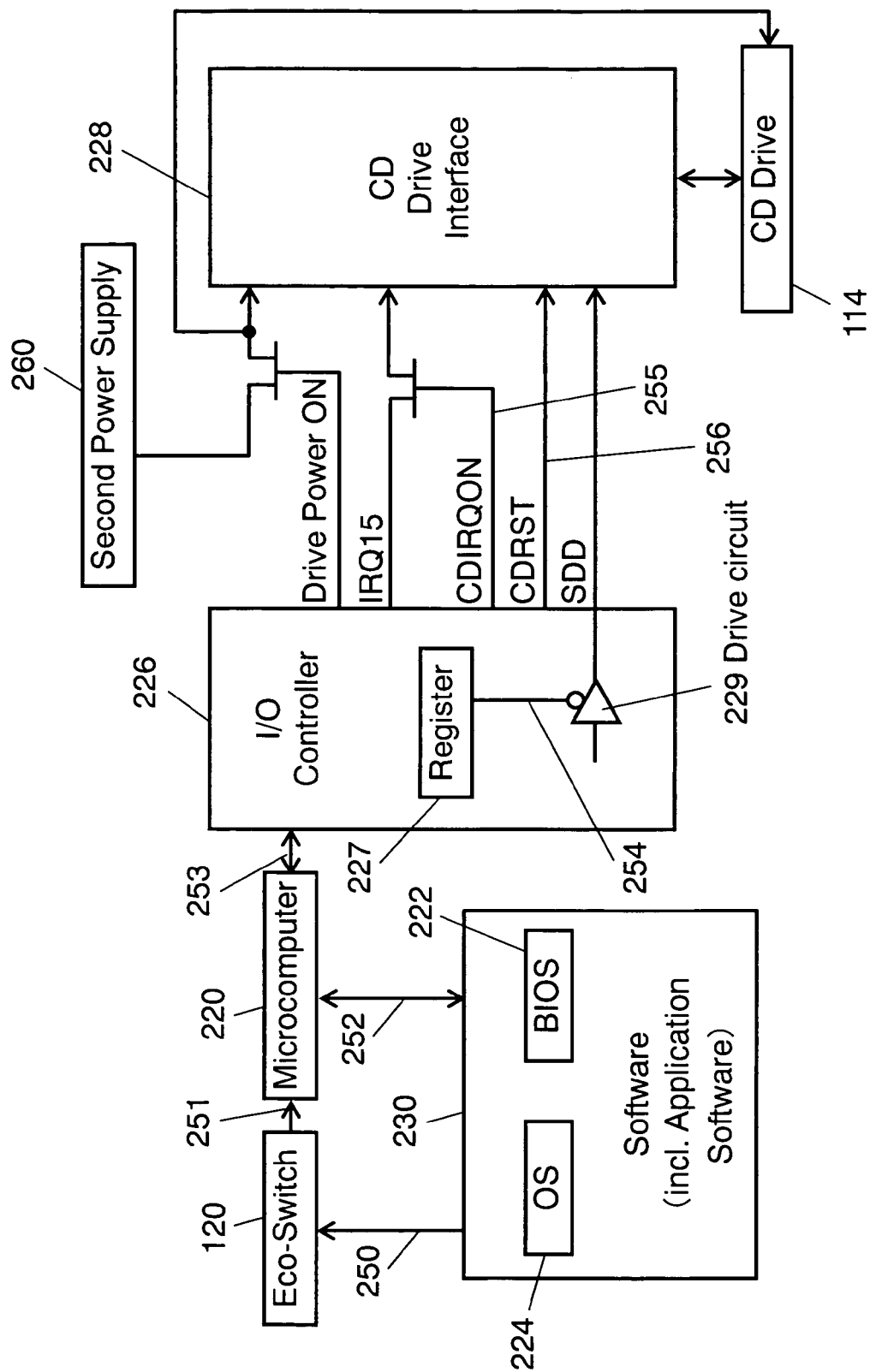
FIG. 2 is a circuit diagram showing important portions of notebook type personal computer in accordance with a first exemplary embodiment of the present invention.

Circuit diagram of notebook type personal computer 100 in the important portion relevant to the CD drive 114 power-ON sequence is shown in FIG. 2; while FIG. 3 is a flow chart of CD drive 114 power-ON sequence in the important portion.

Now, referring to FIG. 2 and FIG. 3, the main processing stream of CD drive 114 power-ON sequence is described.

Suppose eco-switch 120 had already been turned ON, or the switch is turned ON (S303), the information that eco-switch 120 is ON is delivered from eco-switch 120 to microcomputer 220 via signal line 251 shown in FIG. 2 (S305).

The terminology microcomputer 220 in the present description includes those generally called a microcomputer. Besides, it includes those having other names, such as a system controller, a CPU, a MPU, a processor, a computer, a microcomputer core, a DSP, etc. In the present invention, the terminology microcomputer 220 includes any one of such items, irrespective of the wording given.

Upon receiving the information that eco-switch 120 is ON, microcomputer 220 sends it via signal line 252 to BIOS 222, which being a part of software 230 (S307).

The software includes, for example, an OS, various types of application programs and other programs, which being software stored in a non-volatile memory section or software stored in a non-volatile memory section that has been read-out by the earlier software booted, for implementing basic functions of the computer.

Although OS 224 and BIOS 222 are shown in FIG. 2 as if each of them is included independently in the software, it is not imperative that OS 224 and BIOS 222 are disposed individually. BIOS 222 can be a part of OS224, or vice versa, or OS 224 and BIOS 222 can be an inseparable integration.

Upon receiving the notice that eco-switch 120 is ON, BIOS 222 checks, via I/O controller 226, as to whether power supply at that moment to CD drive 114 is ON or OFF (S309).

In a case where a CD drive 114 power-ON sequence is executed simultaneously with switching-ON of main switch 112, normally the power supply to CD drive 114 is not yet ON. Therefore, the ON/OFF status of power supply to CD drive 114 at that moment is normally OFF. However, depending on a type of embodiment, the power supply status to CD drive 114 at that moment may be ON.

If the ON/OFF status of power supply to CD drive 114 at this moment is ON (Yes, at S311), the CD drive 114 power-ON sequence finishes as it is without doing anything further (S313).

If the status of power supply to CD drive 114 at this moment is OFF (No, at S311), BIOS 222 instructs I/O controller 226 to turn power supply to CD drive 114 ON, via signal line 252 and signal line 253 (S315). Depending on types of embodiments, the instruction may either be delivered via microcomputer 220, or the instruction may be issued also to microcomputer 220.

Upon receipt of the instruction, I/O controller 226 sets the Drive Power ON signal shown in FIG. 2 to be active, so that second power supply section 260 starts supplying the power to CD drive interface 228 and CD drive 114 (S317).

Next, BIOS 222 writes a certain predetermined value at a specified register 227 in I/O controller 226 to turn drive circuit 229 ON via signal line 254. Thus, I/O controller 226 and CD drive interface 228 are connected with control signal (SSD) (S319).

And then, BIOS 222 gives instruction to microcomputer 220 so that I/O controller 226 activates CDIRQON signal 255, via signal line 252 and signal line 253. Thereby, I/O controller 226 and CD drive interface 228 are connected with IRQ connection (S321). The IRQ connection means to bring an interrupt signal for controlling CD drive 114 into a transmittable/receivable state, using for example IRQ 15 interrupt signal line.

BIOS 222 then gives instruction to microcomputer 220 so that I/O controller 226 negates CDRST signal 256, via signal line 252 and signal line 253. Thereby, CD drive 114 is reset (initialized) to a usable state (S323). Upon receipt of the signal, CD drive 114 shifts to a standby state to be ready for operation at any moment; even if it is in the state of, e.g. disk checking, data reading/writing, or even in an error state, all these operating states or error state are reset.

As soon as the above procedures are completed, OS 224 notifies an operator that CD drive 114 has now been ready for use at any moment (S325).

The above-described series of procedures completes the CD drive 114 power-ON sequence provided for a situation at which eco-switch 120 is turned ON in accordance with a processing sequence at the time when notebook type personal computer 100's main switch 112 is turned ON, or by a subsequent processing sequence, or a situation at which eco-switch 120 had already been turned ON (S313).

Now in the following, a case that is opposite to the above, viz. a CD drive 114 power-OFF sequence provided for a situation at which eco-switch 120 is turned OFF in accordance with a processing sequence at the time when notebook type personal computer 100's main switch 112 is turned ON, or by a subsequent processing sequence, or a situation at which eco-switch 120 had already been turned OFF is described referring to FIG. 2 and FIG. 4.

Figure 4:
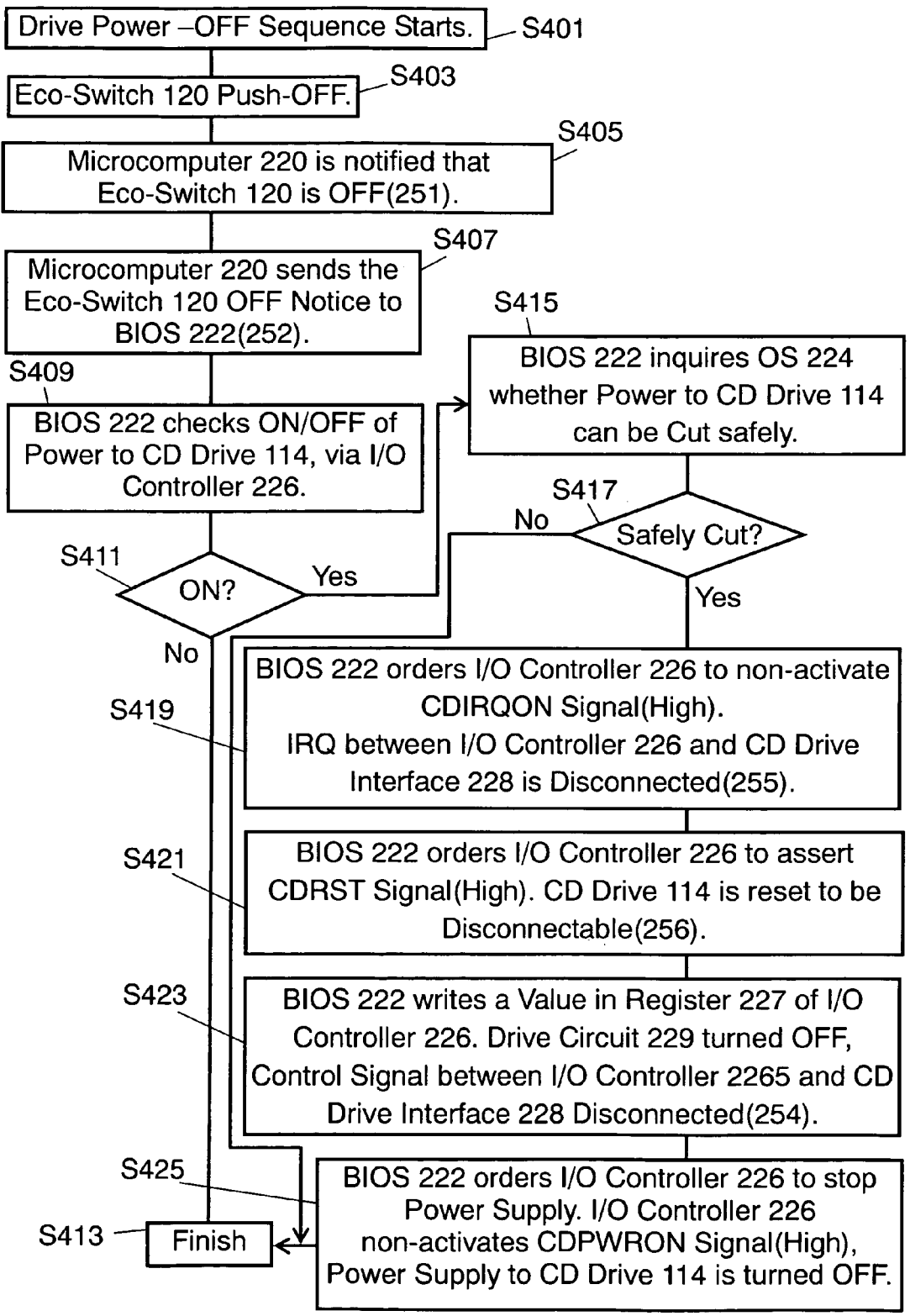
FIG. 4 is a flow chart showing a power-OFF sequence of CD drive in notebook type personal computer in the first embodiment.

As described in the above, the CD 114 power-OFF sequence shown in FIG. 4 is started when eco-switch 112 is turned OFF in accordance with a processing sequence at the time when notebook type personal computer 100's main switch was turned ON, or by a subsequent processing sequence, or a situation at which eco-switch 120 had already been turned OFF (S401).

Circuit diagram of notebook type personal computer 100 in the important portion relevant to CD drive 114 power-OFF sequence is shown in FIG. 2, which drawing being the same as that showing the power-ON sequence. FIG. 4 is a flow chart showing the CD drive 114 power-OFF sequence in the important portion.

Suppose eco-switch 120 had already been turned OFF, or the switch is turned OFF (S403), the information that eco-switch 120 is OFF is delivered from eco-switch 120 to microcomputer 220 via signal line 251 shown in FIG. 2 (S405).

Upon receiving the information that eco-switch 120 is OFF, microcomputer 220 sends it via signal line 252 to BIOS 222, which being a part of software 230 (S407).

Upon receiving the notice that eco-switch 120 is OFF, BIOS 222 checks, via I/O controller 226, as to whether power supply at that moment to CD drive 114 is ON or OFF (S409).

In a case where a CD drive 114 power-OFF sequence is executed simultaneously with switching-ON of main switch 112, normally the power supply to CD drive 114 is not yet ON. Therefore, the ON/OFF status of power supply to CD drive 114 at that moment is normally OFF. However, depending on a type of embodiment, the power supply status to CD drive 114 at that moment may be ON.

If the ON/OFF status of power supply to CD drive 114 at this moment is OFF (No, at S411), the CD drive 114 power-OFF sequence finishes as it is without doing anything further (S413).

If the status of power supply to CD drive 114 at this moment is ON (Yes, at S411), BIOS 222 inquires OS 224 as to whether the power supply to CD drive 114 can be disconnected safely (S415).

If reply from OS 224 indicates that "power supply to CD drive 114 can not be disconnected safely" (No, at S417), the CD drive 114 power-OFF sequence finishes as it is without doing anything further (S413).

If reply from OS 224 indicates that "power supply to CD drive 114 can be disconnected safely" (Yes, at S417), BIOS 222 orders microcomputer 220 to instruct I/O controller 226 to non-activate CDIRQON signal 255, via signal line 252 and signal line 253. Thereby, IRQ between I/O controller 226 and CD drive interface 228 is cut (S419). Cutting IRQ means, for example, blocking the connection between interrupt signal line IRQ 15 and CD drive interface, and to bring an interrupt signal for controlling CD drive 114 into a non-transmittable/non-receivable state.

And then, BIOS 222 orders microcomputer 220 to instruct I/O controller 226 to assert CDRST signal 256, via signal line 252 and signal line 253. Thereby, CD drive 114 is reset (initialized) to a state to be ready for disconnection (S421).

Next, BIOS 222 writes a certain predetermined value at certain specific register 227 in I/O controller 226. Thereby, drive circuit 229 is turned OFF via signal line 254, and control signal (SDD) between I/O controller 226 and CD drive interface 228 is disconnected (S423).

Finally, BIOS 222 instructs I/O controller 226 to stop the power supply, via signal line 252 and signal line 253 (S425). Upon receipt of the instruction, I/O controller 226 sets Drive Power ON signal shown in FIG. 2 to be non-active, and the power supplies from second power supply section 260 to CD drive interface 228 and CD drive 114 are disconnected (S425).

Depending on a type of embodiment, the instruction may be given either via microcomputer 220, or the instruction may be given also to microcomputer 220.

As soon as the above procedure is completed, OS 224 notifies an operator that CD drive 114 is now unable to operate. However, the notice may not necessarily be given, depending on a type of embodiment.

After the power supply from second power supply section 260 is disconnected, OS 224, BIOS 222 or software 230 containing these execute all of the procedures registering that no CD drive 114 has been connected from the beginning.

Therefore, for example, no time is wasted for making access for checking a connection status of CD drive 114 or confirming validity of the connection and the system file during a power-ON sequence of notebook type personal computer 100 itself at the time when main switch 112 is turned ON. Thus a boot up of notebook type personal computer 100 proceeds smoothly.

Furthermore, there will be no risk that a substantial power-OFF sequence is not started due to an access made for checking the validity of file system conducted during a power-ON sequence of notebook type personal computer 100 itself, when the conditions as to whether or not executing a substantial power-OFF sequence include an item that "there has been no access made within a certain specific time span". This point will be described again later.

The above-described series of procedures completes the CD drive 114 power-OFF sequence provided for a situation at which eco-switch 120 is turned OFF in accordance with a processing sequence at the time when notebook type personal computer 100's main switch 112 is turned ON, or by a subsequent processing sequence, or a situation at which eco-switch 120 had already been turned OFF (S413).

Second Embodiment

In the above first embodiment of the present invention, the determination as to whether or not to start a substantial CD drive 114 power-ON sequence, or CD drive 114 power-OFF sequence, (S311 in FIG. 3 and S411 in FIG. 4) was made based on the result of checking conducted with respect only to an ON/OFF state of power supply at that moment to CD drive 114. In the present second embodiment of the present invention, it further checks whether or not CD drive 114, which is compatible with a removable recording medium, is set with a removable recording medium (CD recording medium 116 in FIG. 1).

The rest part of second embodiment remains the same as that of the first embodiment, so description on which part is omitted here; only the points of difference will be described below.

Figure 5:
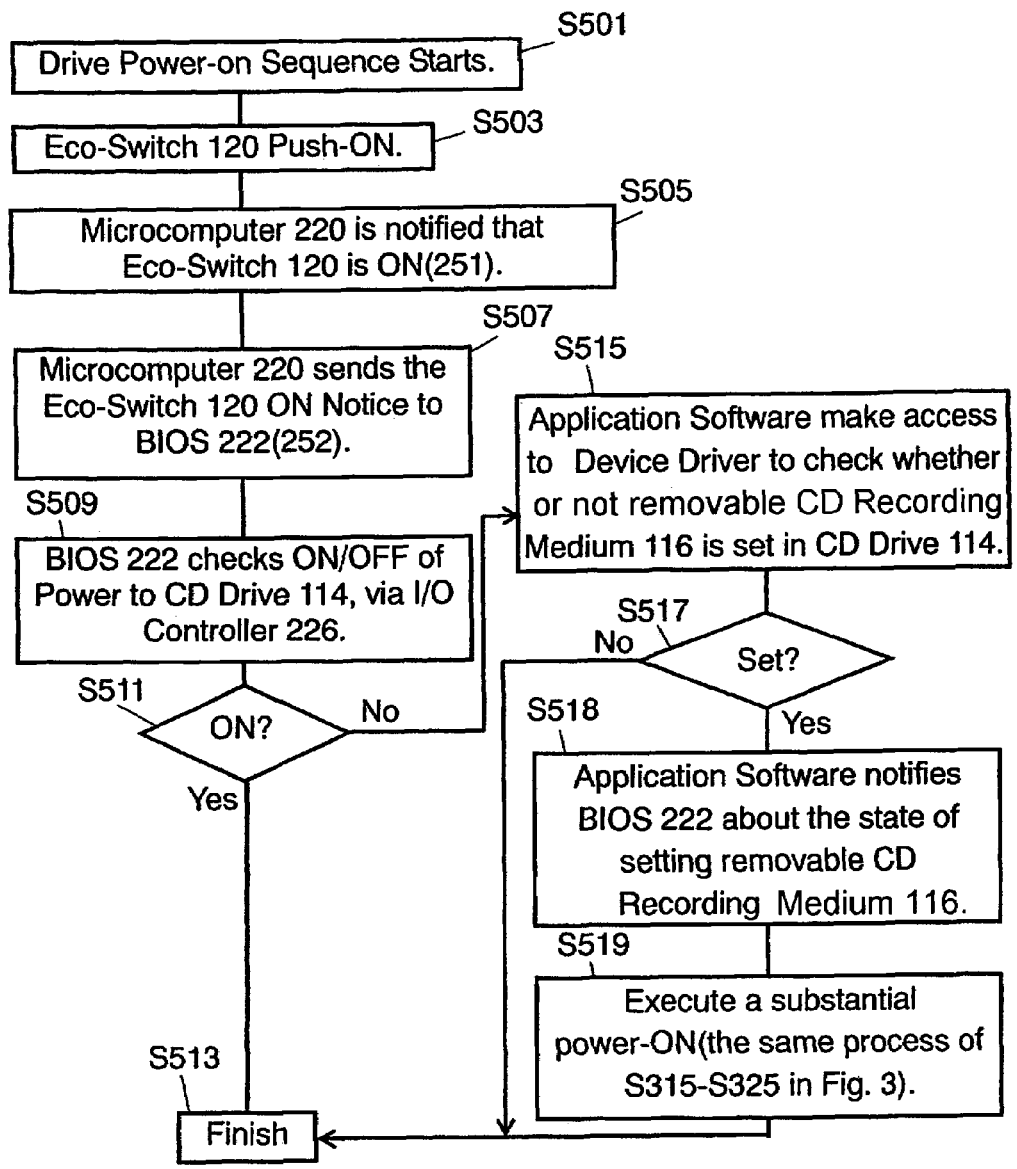
FIG. 5 is a flow chart showing a power-ON sequence of CD drive in notebook type personal computer in accordance with a second embodiment of the present invention.

FIG. 5 is a flow chart showing important portion of a CD drive 114 power-ON sequence in accordance with a second embodiment of the present invention.

S501 through S511 and S513 of FIG. 5 are substantially the same as S301 through S311 and S313 of FIG. 3 which shows the first embodiment. So, descriptions on these items are eliminated.

In a CD drive 114 power-ON sequence in the second embodiment of the present invention, when power supply to CD drive 114 is OFF (No, at S511), application software makes access to device driver to check whether or not removable CD recording medium 116 is set in CD drive 114 (S515).

If, as the result of checking, CD drive 114 is found out that it is not set with removable CD recording medium 116 (No, at S517), the CD drive 114 power-ON sequence in the present second embodiment finishes without doing any substantial power-ON sequence (S513).

In a CD drive 114 power-ON sequence in the present second embodiment, an application software notifies BIOS 222 about the state of setting of removable CD recording medium 116 (S518) only when removable CD recording medium 116 is set on CD drive 114 (Yes, at S517). And then, a substantial power-ON sequence is executed (S519).

The checking of CD drive 114 power supply ON/OFF state (S509, S511) and the checking of CD recording medium 116 setting state (S515, S517) are not required to be conducted in the above-described order. These checking works may be performed in the reverse order.

Substantial power-ON sequence in the present second embodiment (S519) is identical to that in the first embodiment shown in FIG. 3, S315 through S325. So, description on which is omitted here.

In the above first embodiment of the present invention, determination as to whether or not to start a substantial CD drive 114 power-OFF sequence (S411 in FIG. 4) was made by checking only an ON/OFF state of power supply at that moment to CD drive 114. In the present second embodiment, it further checks whether or not CD drive 114, which is compatible with a removable recording medium, is set with a removable recording medium (CD recording medium 116 in FIG. 2).

For the rest, the CD drive 114 power-OFF sequence in the present second embodiment remains the same as that of the first embodiment. So, description on which part is omitted, and only the points of difference will be described below.

Figure 6:
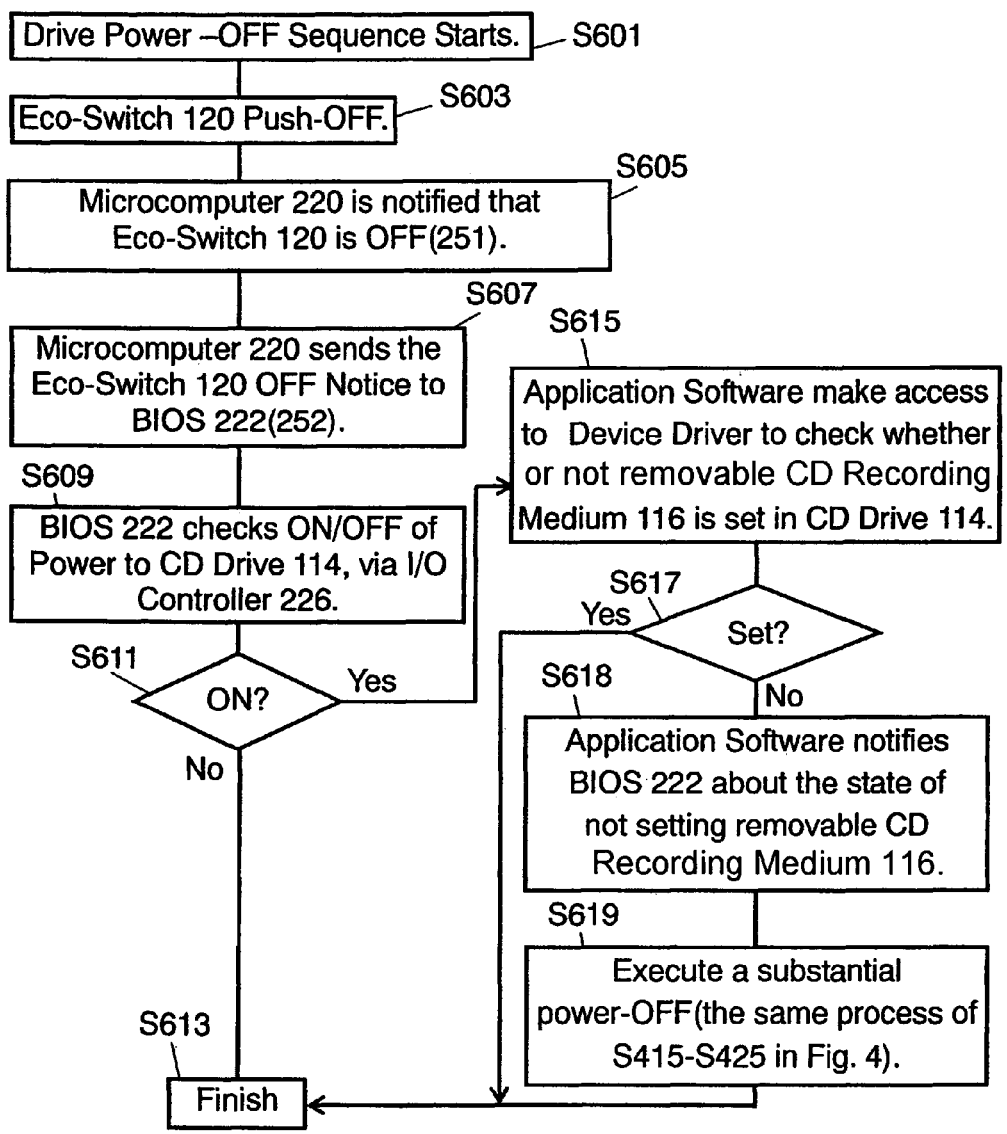
FIG. 6 is a flow chart showing a power-OFF sequence of CD drive in notebook type personal computer in the second embodiment.

FIG. 6 is a flow chart showing a CD drive 114 power-OFF sequence in the important part in the present second embodiment.

S601 through S611 and S613 in FIG. 6 are substantially the same as S401 through S411 and S413 of FIG. 4 which shows the first embodiment of the present invention. So, descriptions on these items are omitted here.

In a CD drive 114 power-OFF sequence in accordance with the second embodiment, when a state of power supply to CD drive 114 is ON (Yes, at S611), an application software makes access to device driver to check whether or not CD drive 114 is set with removable recording medium 116 (S615).

If, as the result of checking, CD drive 114 is found out to have been set with removable recording medium 116 (Yes, at S617), the CD drive 114 power-OFF sequence in the present second embodiment finishes without doing any substantial power-OFF sequence (S613).

In the CD drive 114 power-OFF sequence in the present second embodiment, an application software notifies BIOS 222 about a setting state only when removable CD recording medium 116 is not set in CD drive 114 (No, at S617)(S618). And, a substantial power-OFF sequence is executed (S619).

The checking of CD drive 114 power supply ON/OFF state (S609, S61) and the checking of CD recording medium 116 setting state (S615, S617) are not required to be conducted in the above-described order. These checking works may be conducted in the reverse order.

Substantial power-OFF sequence in the present second embodiment (S619) is identical to that in the first embodiment shown in FIG. 4, S415 through S425. So, no description is made here.

Third Embodiment

In the above first embodiment of the present invention, determination as to whether or not to start a substantial CD drive 114 power-ON sequence, or CD drive 114 power-OFF sequence (S311 in FIG. 3 and S411 in FIG. 4), was made by checking only an ON/OFF state of power supply at that moment to CD drive 114. The second embodiment of the present invention further checked whether or not CD drive 114 compatible with removable recording medium is set with a removable recording medium (CD recording medium 116 in FIG. 2).

In the present third embodiment, determination as to whether or not to start a substantial CD drive 114 power-ON sequence, or CD drive 114 power-OFF sequence, is made based on an additional criterion that there has been no access made to CD drive 114 for a certain specified time span. A substantial CD drive 114 power-OFF sequence is started only when the above criterion is satisfied.

Figure 7:
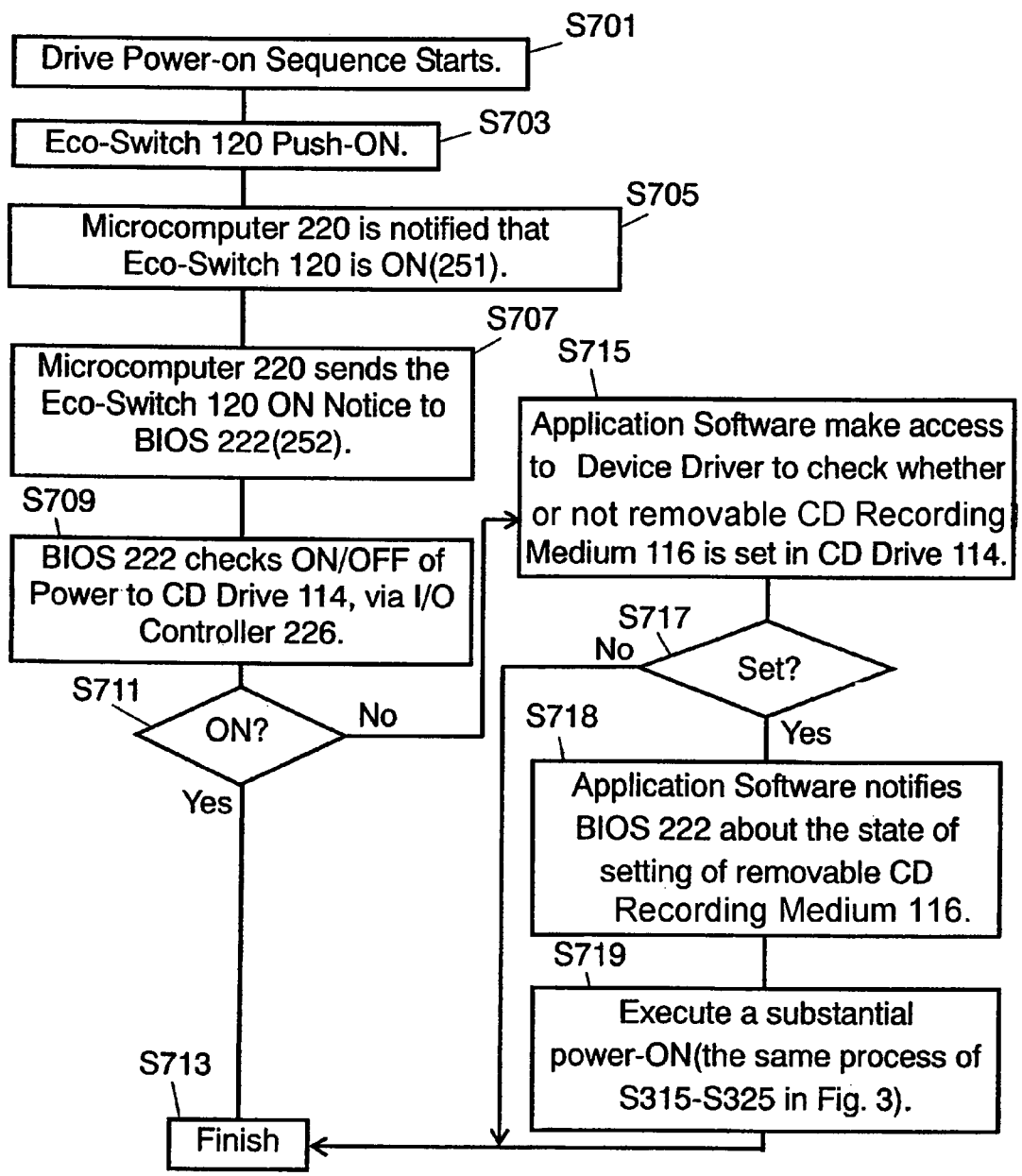
FIG. 7 is a flow chart showing a power-ON sequence of CD drive in notebook type personal computer in accordance with a third embodiment of the present invention.

FIG. 7 is a flow chart showing a CD drive 114 power-ON sequence in the important portion in accordance with a third embodiment. This flow chart remains the same as the CD drive 114 power-ON sequence in the second embodiment. So, description on which is eliminated here.

Figure 8:
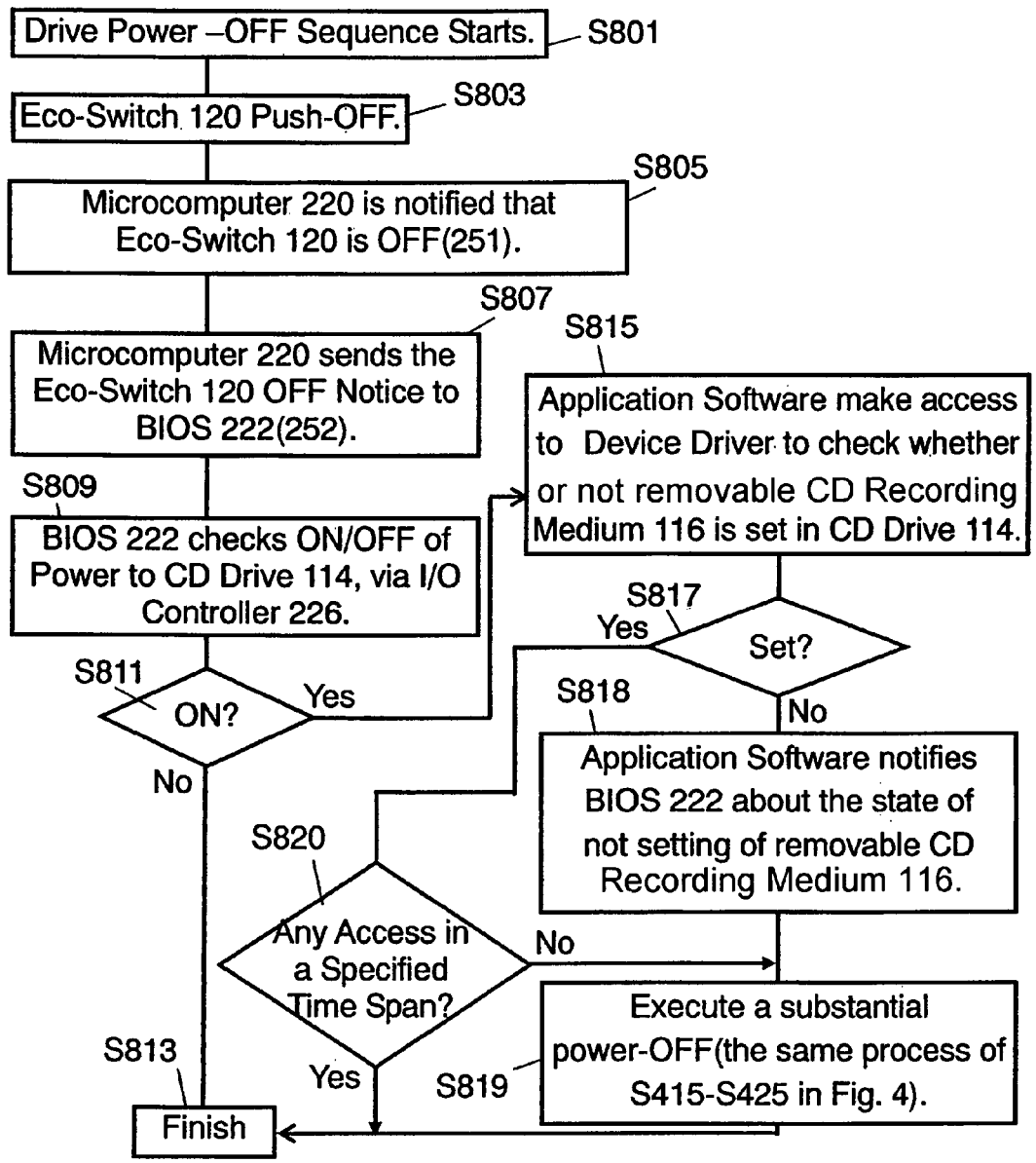
FIG. 8 is a flow chart showing a power-OFF sequence of CD drive in notebook type personal computer in the third embodiment.
Figure 9:
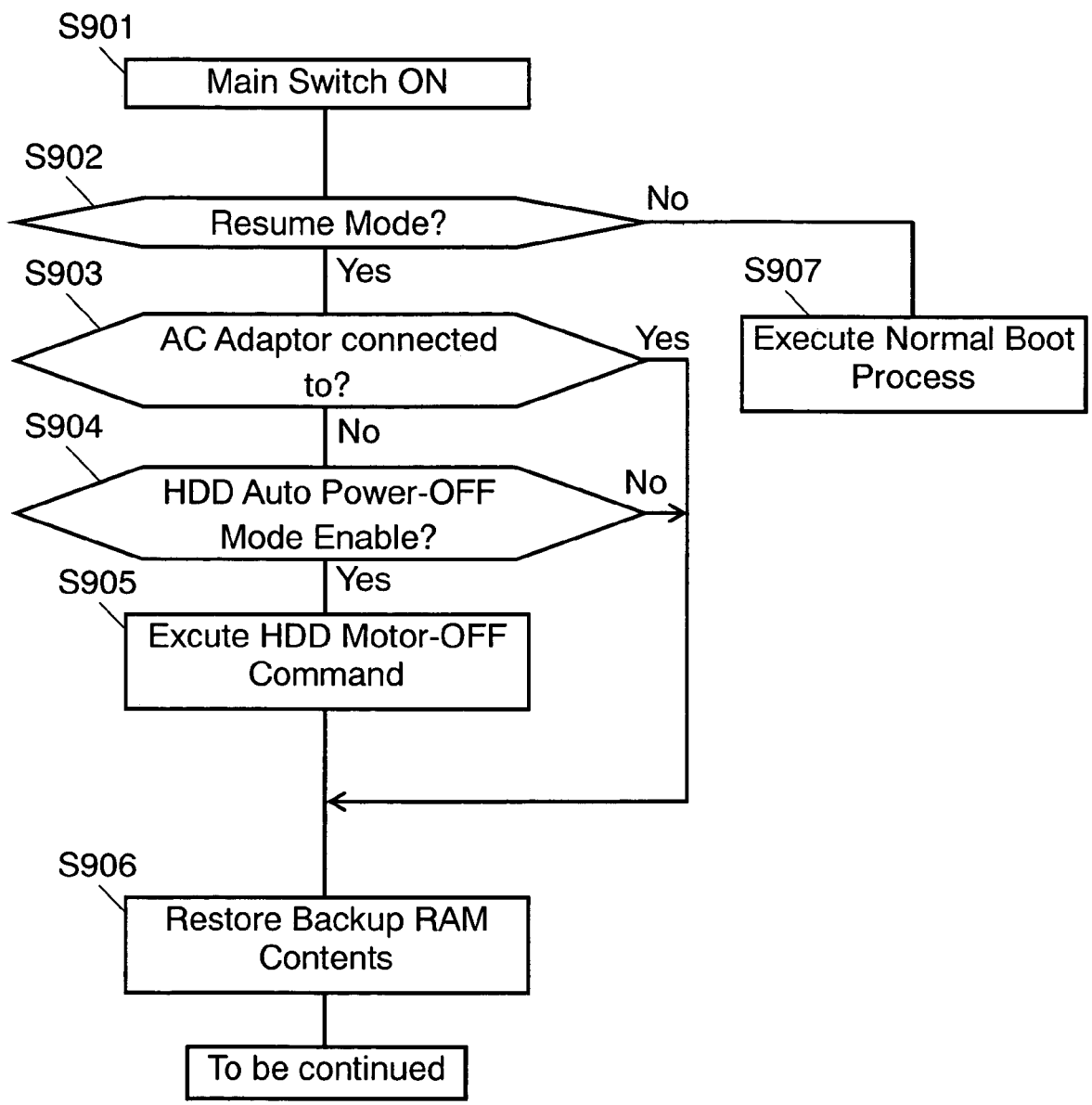
FIG. 9 is a flow chart showing a flow at initial processing stage in a conventional information processing apparatus, or a personal computer, having a power supply control function.

FIG. 8 is a flow chart showing a CD drive 114 power-OFF sequence in the important portion in the present third embodiment. With the exception of step S820, the flow chart remains the same as that of CD drive 114 power-OFF sequence in the second embodiment. Therefore, only the procedure at step S820 is described below.

After confirming that CD drive 114 is having removable CD recording medium 116 set therein (Yes, at S817), a power-OFF sequence in the present third embodiment checks whether or not there was an access made to CD drive 114 within a certain specific time span (for example, within past 30 min. retroactive from the present moment) (S820).

After confirming that there was no such access made to CD drive 114, a substantial CD drive 114 power-OFF sequence is started even if there is CD recording medium 116 in CD drive 114 (S819). This is because the absence of access to CD drive 114 for a certain time span leads to a judgment that the probability of actual use is low, despite that CD recording medium 116 is set in CD drive 114.

If such an access is confirmed to have been made to CD drive 114, a CD drive 114 power-ON sequence in the present third embodiment finishes without doing any substantial power-OFF sequence.

Besides the above-described criteria used in determining whether or not starting a substantial CD drive 114 power-ON sequence, or CD derive 114 power-OFF sequence, such other factors may also be employed; for example, a state of CD drive 114's section used for setting/removing CD recording medium 116, e.g. lid, cover, whether it is open or closed, pushed in or protruding, etc. Whether CD recording medium 116 is in a state where it can be removed immediately or not may be inferred based on such information. Or, a substantial CD drive 114 power-OFF sequence may be started only when immediate removal/setting of a recording medium appears to be very difficult; e.g. when a lid has been staying closed, or a sliding port has been kept pushed-in.

The above-described are just examples. Depending on a type of embodiment, the conditioning may be just opposite; viz. a substantial CD drive 114 power-OFF sequence may be started only when a recording medium appears to be readily detachable/attachable any moment.

Furthermore, any optional combination of the above-described factors may be used as the condition for starting a substantial CD drive 114 power-ON/OFF sequence. Namely: only a state of eco-switch 120, whether or not removable CD recording medium 116 is set in CD drive 114, an ON/OFF state of power supply at that moment to CD drive 114, that there is no access made to CD drive 114 for a certain specific time span, a state of a section provided for removing/setting CD recording medium 116, or a combination of two, three, four or more number of factors e.g. a state of eco-switch 120, that there is no access made to CD drive 114 for a certain specific time span, a state of a section provided for removing/setting CD recording medium 116 or other factors, may be used for the purpose.

As described in the foregoing, an information processing apparatus in the present invention cuts power supply, when there is no access made to the recording section, to not only the recording section itself but also such constituent members which are used for making access to the recording section. In this way, the present invention enhances the advantage of low-power consumption.

Furthermore, since the operating system, device driver and the like software proceeds the processing based on an assumption that there has been no connection of the recording section, the unnecessary setting procedures do not take place at the time of power-ON. This contributes to make a boot up time of an information processing apparatus shorter at the power-ON.

Still further, an information processing apparatus in the present invention ensures its advantage of low-power operation by automatically cutting the power supplies to the recording section itself and to constituent members used for making access to the recording section in a situation at which there is no recording medium set in the recording section or no access for a certain specific time span, without requiring an operator doing anything in advance.

Thus the present invention seems to offer a vast industrial applicability.

What is claimed is:

1. An information processing apparatus comprising:
    a recording section for recording and reproducing information in a removable recording medium;
    a switch;
    a computer;
    a power supply section for supplying power to the recording section and the computer;
    an operating system, or software, for controlling the computer; and
    a device driver, or software, for controlling the recording section disposed as a part of or separate from the operating system,
    wherein the power supply section controls a power supply to the recording section and the computer individually, only the power supply to the recording section being controlled ON/OFF corresponding to a state of the switch such that when the switch is OFF only the power supply to the recording section is controlled OFF, and the operating system performs processing based on a presumption that the recording section is not connected and the device driver registers based on a presumption that the recording section is not connected, and
    wherein even if the switch is ON, corresponding to a state of the switch while the recording section is not set with the removable recording medium, the device driver registers based on a presumption that the recording section is not connected.

2. The information processing apparatus of claim 1, wherein
    the switch is that which is operated by an operator or that which is controlled by software, or both of these.

3. The information processing apparatus of claim 1, wherein
    only the power supply to the recording section is turned OFF in accordance with control by the computer performed by the software when there is no access made to the recording section for a specific time span.

4. The information processing apparatus of claim 1, wherein
    the recording section is that which records information on a disk recording medium by taking advantage of an optical technology or a magnetic technology, or both of these technologies.

5. The information processing apparatus of claim 1, wherein the power supply section is that which is battery-based.

6. The information processing apparatus of claim 1, wherein
    the processing apparatus is a notebook type personal computer, a personal digital assistant, a portable telephone unit, a portable global positioning system, a portable music player or a portable video player, or that which performs either one, or a plurality, of these functions in part or in the entirety.

7. The information processing apparatus of claim 1, wherein
    the recording section stores information in an affixed storage medium.

8. An information processing apparatus comprising:
    a recording section for recording and reproducing information in a removable recording medium;
    a switch;
    a computer;
    a power supply section for supplying power to the recording section and the computer;
    an operating system, or software, for controlling the computer; and
    a device driver, or software, for controlling the recording section disposed as a part of or separate from the operating system,
    wherein the power supply section controls a power supply to the recording section and the computer individually, only the power supply to the recording section being controlled ON/OFF corresponding to a state of the switch such that when the switch is OFF only the power supply to the recording section is controlled OFF, and the operating system performs processing based on a presumption that the recording section is not connected and the device driver registers based on a presumption that the recording section is not connected, and
    wherein even if the switch is OFF, corresponding to a state of the switch while the recording section is not set with the removable recording medium, the device driver registers based on a presumption that the recording section is not connected.

9. The information processing apparatus of claim 8, wherein
    the switch is that which is operated by an operator or that which is controlled by software, or both of these.

10. The information processing apparatus of claim 8, wherein
    only the power supply to the recording section is turned OFF in accordance with control by the computer performed by the software when there is no access made to the recording section for a specific time span.

11. The information processing apparatus of claim 8, wherein
    the recording section is that which records information on a disk recording medium by taking advantage of an optical technology or a magnetic technology, or both of these technologies.

12. The information processing apparatus of claim 8, wherein the power supply section is that which is battery-based.

13. The information processing apparatus of claim 8, wherein the processing apparatus is a notebook type personal computer, a personal digital assistant, a portable telephone unit, a portable global positioning system, a portable music player or a portable video player, or that which performs either one, or a plurality, of these functions in part or in the entirety.

14. The information processing apparatus of claim 8, wherein the recording section stores information in an affixed storage medium.

* * * * *